United States Patent [19]

Myers

[11] 4,073,268

[45] Feb. 14, 1978

[54] ROTARY COMBUSTION ENGINE WITH SIDE HOUSING BY-PASS PASSAGES

[75] Inventor: David M. Myers, Upper Saddle River, N.J.

[73] Assignee: Curtiss-Wright Corporation, Wood-Ridge, N.J.

[21] Appl. No.: 713,386

[22] Filed: Aug. 11, 1976

[51] Int. Cl.² ............................................ F02B 53/00
[52] U.S. Cl. ..................................... 123/8.13; 123/8.45
[58] Field of Search ............... 60/901; 123/8.05, 8.13, 123/8.45

[56] References Cited

U.S. PATENT DOCUMENTS

| | | | |
|---|---|---|---|
| 3,393,666 | 7/1968 | Yamamoto et al. | 123/8.45 |
| 3,854,456 | 12/1974 | Ishii et al. | 60/901 X |
| 3,987,763 | 10/1976 | Klomp | 123/8.45 |
| 3,995,599 | 12/1976 | Shier | 123/8.13 X |

Primary Examiner—Carlton R. Croyle
Assistant Examiner—Michael Koczo, Jr.
Attorney, Agent, or Firm—Victor D. Behn; Arthur Frederick

[57] ABSTRACT

A rotary combustion engine having grooves in the engine side walls for bleeding off unburnt hydrocarbon gases from the trailing end of each working chamber during the late portion of its expansion stroke, these gases being bled through side housing grooves into the space between oil and gas seals on the sides of the rotor from which space the unburnt gases are returned to a working chamber during the intake stroke of said chamber.

5 Claims, 6 Drawing Figures

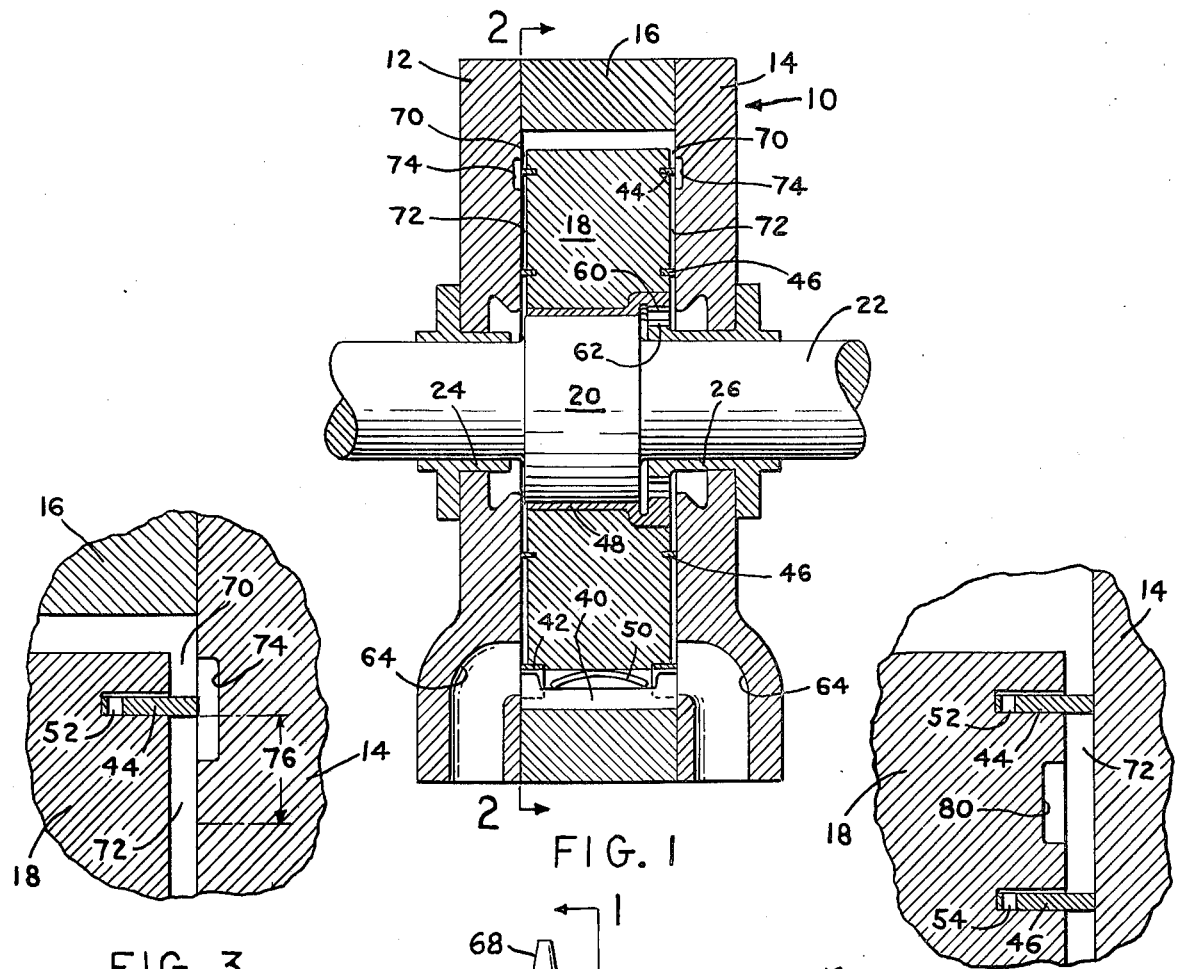
FIG. 3
FIG. 1
FIG. 4
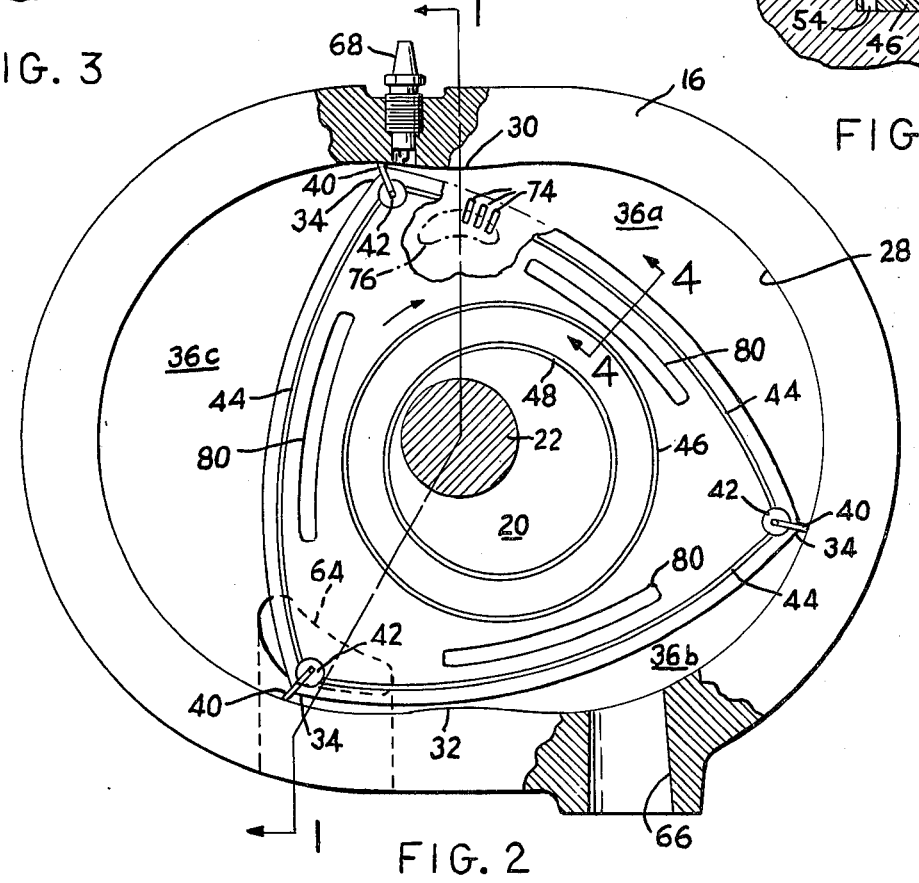
FIG. 2

ROTARY COMBUSTION ENGINE WITH SIDE HOUSING BY-PASS PASSAGES

BACKGROUND OF THE INVENTION

The invention relates to rotary internal combustion engines of the type disclosed in U.S. Pat. No. 2,988,065 granted June 13, 1961 to Wankel et al. In engines of this type the engine working chambers rotate with the engine rotor and as a result unburnt fuel tends to accumulate in the trailing portion of each working chamber from which it is discharged into the engine exhaust port. This problem has been recognized in U.S. Pat. No. 3,393,666 granted July 23, 1968 to Yamamoto et al. In this latter patent, grooves are provided in the engine trochoid surface of the rotor housing in the region in which combustion takes place so that when a rotor apex seal passes over the grooves, the pressure differential across the apex seal blows unburnt fuel into the following working chamber whereby those unburnt gases, in effect, are recycled in the engine. Copending application, Ser. No. 695,046 filed June 11, 1976 now U.S. Pat. No. 4,040,392 by applicant's assignee on an invention of Woodier, discloses an improvement over the Yamamoto et al. arrangement but being similar in that grooves are provided in the trochoid surface of the rotor housing.

A substantial portion of the unburnt combustion gases tend to collect in the narrow or crevice-like space between the rotor and side housings radially outwardly of the rotor gas seals adjacent to the trailing portion of a working chamber during its expansion phase. The arrangement disclosed in the Yamamoto et al. patent and in the copending application of Woodier does not serve to scavenge this crevice-like space of unburnt gases.

SUMMARY OF THE INVENTION

It is an object of the invention to provide a unique and simple arrangement for recycling unburnt gases from the crevice-like space between each rotor side and the side housing radially outwardly of the rotor sides seals as well as the unburnt gases at the trailing end of a working chamber during its expansion phase, these unburnt gases being recycled back into a working chamber during the intake stroke of said latter chamber.

In accordance with the invention, the side walls of the engine are provided with one or more grooves on the downstream side of the minor axis of the trochoidal surface in the region in which combustion takes place, these grooves being positioned so that as an apex portion of the rotor approaches the adjacent end of said minor axis, said grooves bridge and extend radially outwardly across the rotor side gas seal strips disposed at the rotor periphery with the radially inner portions of said grooves terminating in a region which, at all positions of the inner body relative to the outer body, is disposed radially inwardly of the side gas seals carried by the rotor sides adjacent to the rotor periphery and radially outwardly of the annular oil seals also carried by the rotor sides radially inwardly of the side gas seals. With this arrangement, during the expansion stroke of a working chamber, unburnt gases which accumulate in the trailing portion of said chamber and in the adjacent crevice-like space between the rotor and the housing side walls radially outwardly of the rotor side seals, flows through said side wall grooves into the annular space between the rotor gas and oil seals from which space the unburnt gases are subsequently drawn into another working chamber during the intake stroke of said latter chamber.

Accordingly, it is a further object of the invention to provide a rotary engine with grooves in at least one of its side housings disposed so that, during the expansion stroke of a working chamber, unburnt gases at the trailing portion of said chamber and in the adjacent crevice-like space between the engine rotor and side housing are blown through said grooves into the annular space between the gas and oil seals on the side face of the inner body.

It is a further object of this invention to draw said unburnt gases from the annular space between said seals through a recess in the side housing into the working chambers during their intake strokes. In the case of a rotary engine having an intake port in a side housing, the intake port function as said recess in the side housing whereas in the case of a rotary engine having a peripheral intake port rather than a side intake port, a special recess is provided in the side housing for this purpose.

Other objects of the invention will become apparent upon reading the following detailed description in connection with the drawings.

BRIEF DESCRIPTION OF THE DRAWINGS

FIG. 1 is an axial sectional view through a rotary engine embodying the invention and taken along line 1—1 of FIG. 2;

FIG. 2 is a sectional view taken along line 2—2 of FIG. 1;

FIG. 3 is an enlarged view of a portion of FIG. 1;

FIG. 4 is an enlarged sectional view taken along line 4—4 of FIG. 2;

DESCRIPTION OF THE INVENTION

Figure 5:
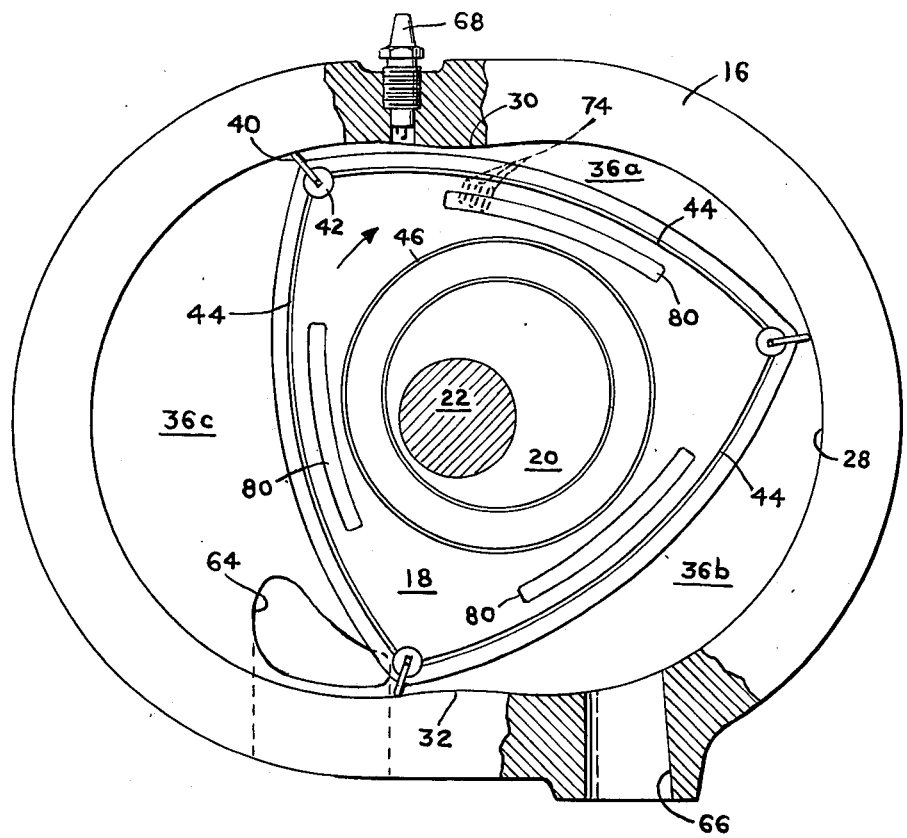
FIG. 5 is a view similar to FIG. 2 but showing the engine rotor in a different position.

Referring to FIGS. 1–4 of the drawing, a rotary combustion engine is schematically indicated at 10, the engine being generally similar to the type of rotary engine disclosed in the aforementioned patents. The engine 10 comprises an outer body or housing consisting of two axially-spaced end or side housings 12 and 14 and an intermediate or rotor housing 16, these housings being secured together to form the engine cavity therebetween. An inner body or rotor 18 is journaled for rotation within said housing cavity on an eccentric portion 20 of a shaft 22, said shaft extending through the side housings 12 and 14 and being supported by bearings 24 and 26 respectively in said side housings.

The peripheral inner surface 28 of the intermediate housing 16 is illustrated as having a two-lobe profile which preferably is basically an epitrochoid, said two lobes joining at diametrically opposed junctions or near-axis regions 30 and 32. The line joining said near-axis regions 30 and 32 is termed the minor axis of the epitrochoid. The rotor or inner body 18 has a generally triangular profile with apex portions 34 having sealing cooperation with the trochoidal surface 28 to form three engine working chambers 36 between the rotor 18 and the engine housing 12, 14 and 16. These three working chambers are distinguished from each other by the reference letters a, b and c, respectively.

For the purpose of said sealing cooperation to form the working chambers 36, each of the rotor apex portions 34 is provided with a seal 40 which extends across the rotor between the inner walls of the end housings 12 and 14. To complete the seal grid around each working chamber 36, corner seal pins 42 are provided at each end of a rotor apex seal 40 and side seal strips 44 are supported in grooves in the end faces of the rotor 18. Each seal strip 44 is disposed close to and is generally parallel to the rotor periphery and runs from one corner seal pin 42 to an adjacent corner seal pin 42 to prevent combustion gases from leaking or flowing radially inwardly between the rotor 18 and adjacent housing side wall. In addition, each end face of the rotor is provided with annular seal means, or oil seal ring 46, to inhibit radially outwardly flow of oil from the rotor bearing 48. As is conventional, suitable springs 50, 52 and 54 are disposed behind the seals 40, 44 and 46 respectively for urging said seals outwardly into sealing engagement with the adjacent housing walls.

The rotary engine 10 also includes suitable gears 60 and 62 which are connected to engine rotor 18 and side housings 14 respectively, to control the relative rotation of the rotor, such gearing being conventional in such engines. In addition, the engine 10 has an intake passage 64 disposed in either or (as illustrated) both of the side housings 12 and 14 adjacent to and on one side of the near-axis region 32 of the trochoid surface 18. In addition, an exhaust passage 66 is disposed in the rotor or peripheral housing 16 adjacent to and on the other side of the near-axis region 32. In the case of a non-diesel type rotary engine, a spark plug 68 is disposed adjacent to the other near-axis region 30 for initiating combustion in the working chambers 36.

The engine structure so far described in conventional and is generally similar to that described in the aforementioned patents and patent application. With such an engine, each working chamber has a four-stroke cycle. Thus, during engine operation and with the engine rotor 18 rotating clockwise as viewed in FIG. 2, when a working chamber 36 is located adjacent to the lobe junction or near-axis region 32, it is open to the intake passage 64 and is starting the first or intake stroke of its cycle as the volume of the chamber increases from a minimum volume condition to a maximum volume condition, at which point the chamber closes to the intake passage. Said chamber 36 now goes through the second or compression stroke of its cycle as its volume decreases to compress its charge until the chamber again reaches a minimum volume condition, but now adjacent to the lobe junction or near-axis region 32. Combustion is initiated in the working chamber adjacent to said near-axis region 30. Thereafter, said working chamber goes through its third or expansion stroke as its volume again increases to its maximum condition and then goes through its fourth or exhaust stroke as the volume decreases to a minimum condition while the chamber is in communication with the exhaust passage 66. Each working chamber 36 in sequence goes through the same four-stroke cycle as the engine operates.

With such an engine, after combustion has been initiated in a working chamber 36, probably because of its inertia unburnt fuel tends to accumulate at the trailing end of said chamber and in the crevice-like space 70 between a side face of the rotor 18 and the adjacent side housing 12 or 14 and radially outwardly of the rotor side gas seal strip 44. Accordingly, when this chamber opens to the exhaust passage 66, this unburnt fuel discharges into the exhaust passage thereby adding to the unburnt hydrocarbons in the engine exhaust emission. For example, with the engine rotor 18 in the position shown in FIG. 2, combustion has already been initiated in the working chamber 36a and this chamber is going through its expansion stroke. Unburnt fuel tends to collect at the trailing end of this chamber and in the adjacent part of the crevice-like space 70.

When the rotor 18 is in the position shown in FIG. 2, the pressure in the working chamber 36a is above atmospheric pressure and is greater than that in the annular space 72 between each side of the rotor 18 and the adjacent housing side wall 12 or 14 and between the seals 44 and 46 carried by said side of the rotor. This is so since, as shown in FIG. 2, at this position of the rotor 18, said annular or interseal space 72 is vented to the intake passage 64. The present invention takes advantage of this pressure differential to cause the unburnt feel which has collected at the trailing end of the chamber 36a (in its position of FIG. 2) and in the adjacent part of the crevice-like space 70 to be blown or to flow into the annular space 72 between the rotor side seals 44 and 46. For this purpose, one or more grooves 74 are provided on the inner surface of each housing side wall 12 and 14 on the downstream side of the trochoid minor axis.

The grooves 74 are so positioned that the radially inner portion of each groove 74 terminates in a region, which at all positions of the rotor 18 relative to the housing, is disposed radially inwardly of the rotor gas seal strip 44 and radially outwardly of the rotor annular oil seal 46. Actually, in a rotary engine such as the engine 10, there is a region 76 on the adjacent side wall near the near-axis region 30 which is not swept over by either the side gas seals 44 or by the oil seal 46. Thus, this region 76 is always between said seals 44 and 46. A similar region 76 (not illustrated) exists adjacent to the other near-axis region 32. The exact shape and size of these regions 76 depend on the particular geometry of the epitrochoid 28. A more detailed description of the regions 76 is found in prior U.S. Pat. No. 3,112,870 granted Dec. 3, 1963 to Bentele and assigned to applicant's assignee.

Thus, the radially inner portion of each of the leakage grooves 74 terminates in the region 76. With the rotor 18 in its position of FIG. 2, that is when an apex seal 40 is in a region slightly upstream of the near-axis region 30, the radially outer portion of each of the grooves 74 extends radially outwardly beyond the rotor side gas seal 44. This location of the grooves 74 is best seen in FIGS. 2 and 3. Thus, with the rotor 18 in the position of FIG. 2, the pressure differential between the pressure in the working chamber 36a and that in the interseal space 72 will blow unburnt gases from the adjacent part of the crevice-like space 70 and the trailing portion of the working chamber 36a into the interseal annular space 72. From this annular interseal space, these unburnt gases are subsequently drawn into a working chamber 36 when the rotor side seal strip 44 for said latter chamber bridges the intake port 64. Thus, with the rotor 18 in the position of FIG. 2, the working chamber 36c is still in its intake stroke and the side seal strip 44 for said chamber bridges the intake port 64. Hence, when the rotor is in this position, any unburnt or other gases in the interseal space 72 is drawn into the intake port by its low suction pressure and thence into the chamber 36c where said gases have another chance to burn.

With the present invention, therefore, unburnt gases, at the trailing end of a working chamber 36 undergoing its expansion stroke and from the adjacent part of the crevice-like space 70, are transferred to a working chamber 36 in its intake stroke. Removal of unburnt fuel from the crevice-like space 70 is an important feature of this invention because unburnt fuel particularly tends to accumulate in such crevice-like spaces.

The grooves 74 must be positioned so that they only bridge a gas seal strip 44 while the adjacent working chamber 36 is in its expansion stroke and not while the adjacent working chamber is in its compression stroke. For this purpose, the grooves 74 are positioned adjacent to but on the downstream side of the minor-axis (the line through the points 30 and 32) of the trochoid and only project a short distance radially outwardly of a gas seal strip 44 when an apex seal 40 is positioned in a region which is a short distance upstream of the near-axis region 30. The outer ends of the grooves 74 are located so that they do not project beyond the rotor side seals 44 into communication with a working chamber until the engine rotor 18 reaches approximately the position of FIG. 2. That is, the grooves do not project beyond the side seals 44 into communication with a working chamber 36 until the engine shaft 22 has rotated approximately 110° beyond the position when said chamber is at its minimum volume position (top dead center position) adjacent to the near-axis region 30.

With this positioning of the grooves 74, they do not open to a working chamber 36 until the chamber is in a late portion of its expansion stroke and, therefore, any adverse effect of the grooves 74 on the energy obtained from the combustion gases during the expansion stroke is minimized. For example, FIG. 5 shows the position of the rotor a short time prior to its position of FIG. 2 and in which the working chamber 36a is now in an earlier portion of its expansion stroke. As illustrated, in FIG. 5 the grooves still do not straddle the adjacent side seal strip 44 of the rotor.

Obviously, the grooves 74 cannot be positioned too far from troichoid minor-axis otherwise they will not bridge the side seal strip until the adjacent working chamber is open to the exhaust port 66. In such a situation the pressure differential across the ends of the grooves 74 would be small and therefore the grooves would be ineffective for causing unburnt gases to flow into the interseal space 72.

The radial dimension of the interseal annular space 72 becomes relatively narrow midway between the apex seals 40. This is particularly so in certain rotary engines. For this reason the rotor sides may, as illustrated, be provided with a plurality of grooves 80 between its side gas seal strips 44 and the oil seal 46 and with one of these grooves being positioned in each region midway between a pair of apex seals 40. In lieu of the three grooves 80 illustrated, one continuous annular groove may be substituted. These grooves 80 help to transfer gases around the interseal space 72 to the region of intake port 64.

Figure 6:
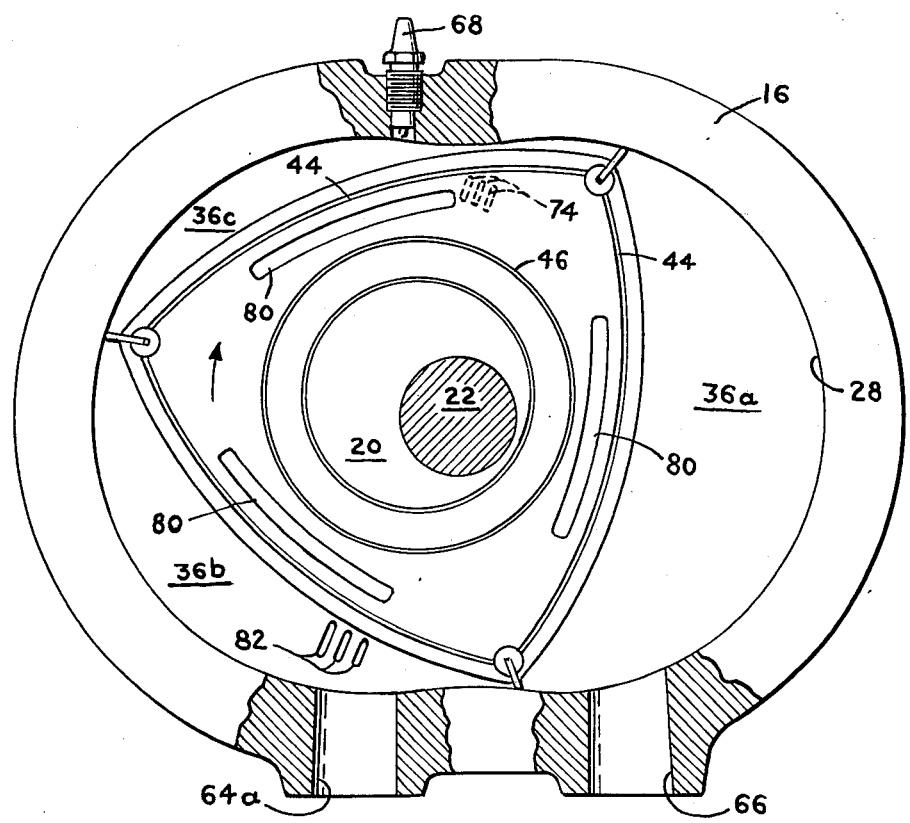
FIG. 6 is a view similar to FIG. 2 showing a modified form of the invention.

As illustrated, the engine 10 has a side intake port 64 in each side housing 12 and 14. If, however, the engine has only one side intake port or in lieu of a side intake port has a peripheral intake port 64a as in FIG. 6, then as illustrated in FIG. 6, additional grooves or recesses 82 are provided in the engine side housings to transfer unburnt gases from the annular interseal space 72 into a working chamber undergoing its intake stroke. Accordingly, the grooves or recesses 82 would be located in the same region of a side housing that a side intake port (such as the port 64 in FIG. 1) would be located if one were provided. The modification of FIG. 6 is otherwise like that of FIGS. 1 and 2. It is noted that with the rotor 18 in its position of FIG. 6, with a working chamber 36c approaching its top dead center position, the grooves 74 do not straddle the adjacent rotor side seals 44.

From the foregoing it is apparent that the grooves 74 are positioned so that they do not straddle the rotor side seals 44 to provide communication with the trailing end of a working chamber 36 and its crevice-like space 70 with the interseal space 72 until a working chamber 36 reaches approximately the position of the chamber 36a in FIG. 2 and this communication continues throughout substantially the balance of the expansion stroke of said chamber.

It should be understood that this invention is not limited to the specific details of construction and arrangement thereof herein illustrated and that changes and modifications may occur to one skilled in the art without departing from the spirit or scope of the invention.

What is claimed is:

1. A rotary combustion engine comprising:
   a. an outer body including a pair of spaced side walls and an intermediate peripheral wall defining an internal cavity therebetween with the inner surface of said peripheral wall having a multi-lobe profile which is basically an epitrochoid and in which the lobes are joined by regions disposed relatively near to the engine axis;
   b. an inner body of generally polygonal profile mounted for relative rotation within said outer body cavity, the apex portions of said inner body having sealing cooperation with said multi-lobe peripheral surface to define a plurality of working chambers between said bodies which vary in volume in response to said relative rotation;
   c. seal strip means carried by the inner body on a side face of the inner body adjacent to its periphery and annular seal means co-axially carried by the inner body on said side face radially inwardly of said seal strip means with both said seal strip means and said annular seal means being disposed for sealing contact with the adjacent side wall of the outer body;
   d. said last-mentioned side wall of the outer body having groove means on its inner surface disposed adjacent to and on the downstream side of a near-axis region at which combustion takes place such that the radially inner portion of said groove means terminates in a region which at all positions of the inner body relative to the outer body is disposed radially inwardly of the seal strip means and radially outwardly of the annular seal means and the radially outer portion of said groove means does not project radially outwardly beyond the seal strip means until the adjacent working chamber is in a late portion of its expansion stroke with the trailing apex portion for said working chamber being disposed in a region a short distance upstream of said near-axis region; and
   e. said last-mentioned side wall also having recess means disposed on its inner surface adjacent to and on the downstream side of another of said near-axis regions for transferring gases from the annular space between said seal strip means and annular seal means of the inner body to the engine working chambers during the intake stroke of said chambers.

2. A rotary combustion engine, as claimed in claim 1, in which the engine has an intake port disposed in said last mentioned side wall of the outer body and said intake port constitutes said recess.

3. A rotary combustion engine, as claimed in claim 1, in which the engine has an intake port disposed in the intermediate wall of said outer body.

4. A rotary combustion engine, as claimed in claim 1, in which a. said seal strip means and annular seal means are both provided on each side face of the inner body; and b. said groove means and recess means are both provided on the inner surface of each side wall of the outer body.

5. A rotary combustion engine, as claimed in claim 1, and including a shaft having an eccentric portion on which the inner body is journaled and in which said multi-lobe profile is a two-lobe profile and said inner body has a generally triangular profile and further in which said groove means is positioned so that it projects outwardly beyond the seal strip means for a short period of time when the shaft has rotated approximately 110° from its position where a working chamber is at its minimum volume position adjacent to the near-axis region at which combustion takes place.

* * * * *